United States Patent
Kuehn et al.

(10) Patent No.: US 9,105,917 B2
(45) Date of Patent: Aug. 11, 2015

(54) FUEL CELL STACK

(75) Inventors: Sascha Kuehn, Dresden (DE); Gerhard Matthias Buchinger, Weis (AT); Katrin Klein, Dresden (DE)

(73) Assignee: EZELLERON GMBH, Dresden (DE)

( * ) Notice: Subject to any disclaimer, the term of this patent is extended or adjusted under 35 U.S.C. 154(b) by 572 days.

(21) Appl. No.: 13/384,397

(22) PCT Filed: Jul. 16, 2010

(86) PCT No.: PCT/EP2010/004356
§ 371 (c)(1),
(2), (4) Date: Jan. 17, 2012

(87) PCT Pub. No.: WO2011/006668
PCT Pub. Date: Jan. 20, 2011

(65) Prior Publication Data
US 2012/0122007 A1    May 17, 2012

(30) Foreign Application Priority Data
Jul. 16, 2009 (DE) .......................... 10 2009 034 032

(51) Int. Cl.
*H01M 8/24* (2006.01)
*H01M 8/02* (2006.01)

(52) U.S. Cl.
CPC ............ *H01M 8/243* (2013.01); *H01M 8/0247* (2013.01); *H01M 8/0252* (2013.01); *H01M 8/0271* (2013.01); *Y02E 60/50* (2013.01)

(58) Field of Classification Search
CPC ..... Y02E 60/525; Y02E 60/50; Y02E 60/521; Y02E 60/528; H01M 2008/1293; H01M 8/243; H01M 8/004; H01M 8/1213; H01M 8/1226; H01M 8/04007
USPC .................................................. 429/456, 466
See application file for complete search history.

(56) References Cited

U.S. PATENT DOCUMENTS 7,157,172 B2 *  1/2007  Draper et al. ................. 429/465
7,855,032 B2 * 12/2010  Kamo et al. .................. 429/513

(Continued)

FOREIGN PATENT DOCUMENTS

EP      0321069      6/1989
EP      2063479      5/2009

OTHER PUBLICATIONS

Sammes N M et al.: "Design and fabrication of a 100W anode supported micro-tubular SOFC stack", Journal of Power Sources, Elsevier SA, CH, vol. 145, No. 2, Aug. 18, 2005, pp. 428-434.

*Primary Examiner* — Cynthia H Kelly
*Assistant Examiner* — Monique Wills
(74) *Attorney, Agent, or Firm* — Jacobson Holman, PLLC.

(57) ABSTRACT

The present invention relates to a fuel cell system, in particular solid oxide fuel cell system (SOFC-System), with several tubular fuel cells, whereby several of these fuel cells respectively have at least one inner electrode, an electrolyte surrounding this/these inner electrode(s) at least in sections and at least one outer electrode surrounding the electrolyte at least in sections, so that the electrolyte spatially separates the inner and the outer electrode(s) from each other, at least two of these fuel cells are located or fixated in or on an electrically conducting carrier and/or contact, which connects—electrically conducting—the inner electrode(s) and/or one/several electrical contact(s) of one/several inner electrode(s) of a first tubular fuel cell or a part of such with the outer electrode(s) and/or one/several electrical contact(s) of one/several outer electrode(s) of a second tubular fuel cell or a part of such, whereby the second tubular fuel cell is preferably located directly adjacent to the first tubular fuel cell or to the part of this fuel cell.

12 Claims, 13 Drawing Sheets

(56) References Cited

U.S. PATENT DOCUMENTS

| | | |
|---|---|---|
| 2004/0023101 A1 | 2/2004 | Jacobson et al. ............... 429/38 |
| 2006/0246337 A1* | 11/2006 | Sarkar et al. ................ 429/34 |
| 2007/0281194 A1* | 12/2007 | Cortright et al. ............... 429/26 |
| 2009/0130511 A1 | 5/2009 | Eshraghi et al. ............... 429/26 |
| 2011/0070518 A1* | 3/2011 | Kwon et al. ................ 429/465 |

* cited by examiner

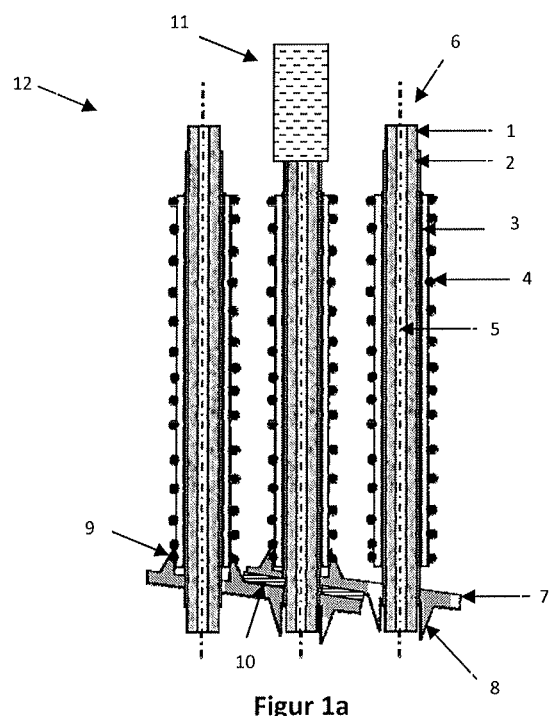
Figur 1a
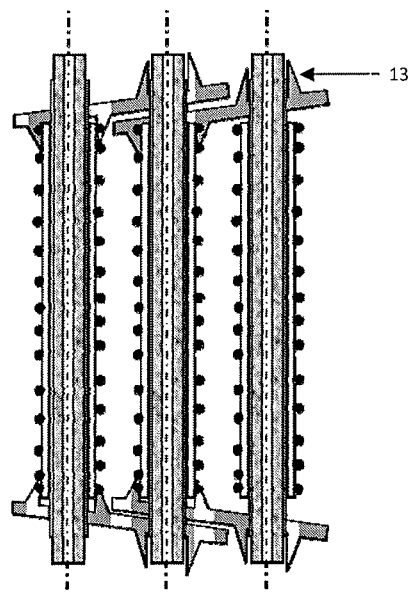
Figur 1b

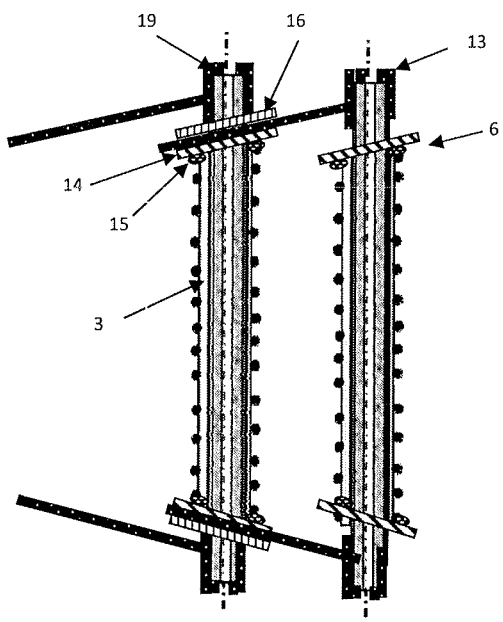
Figur 2

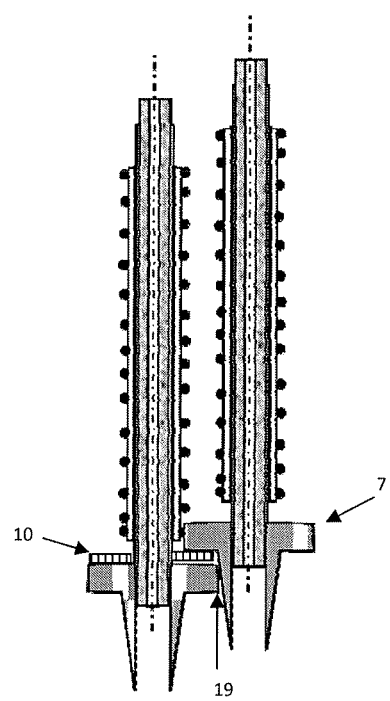
Figur 3

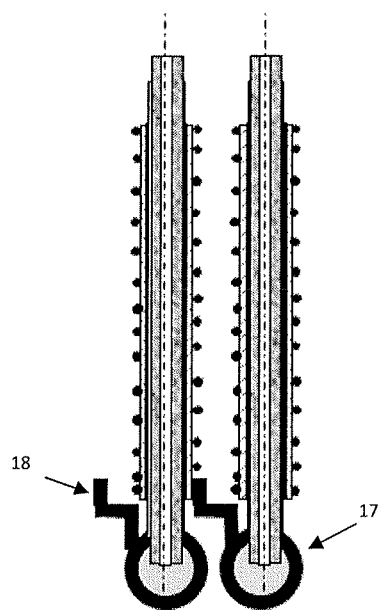
Figur 4

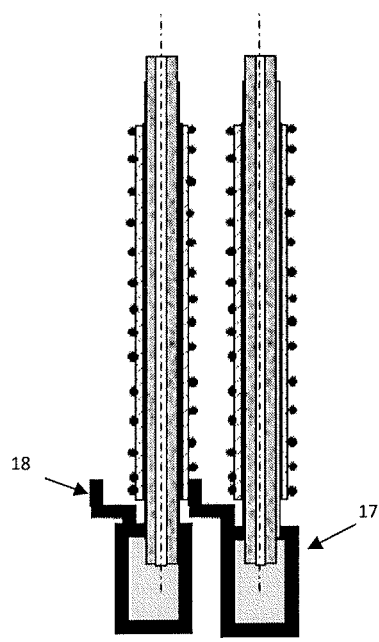
Figur 5

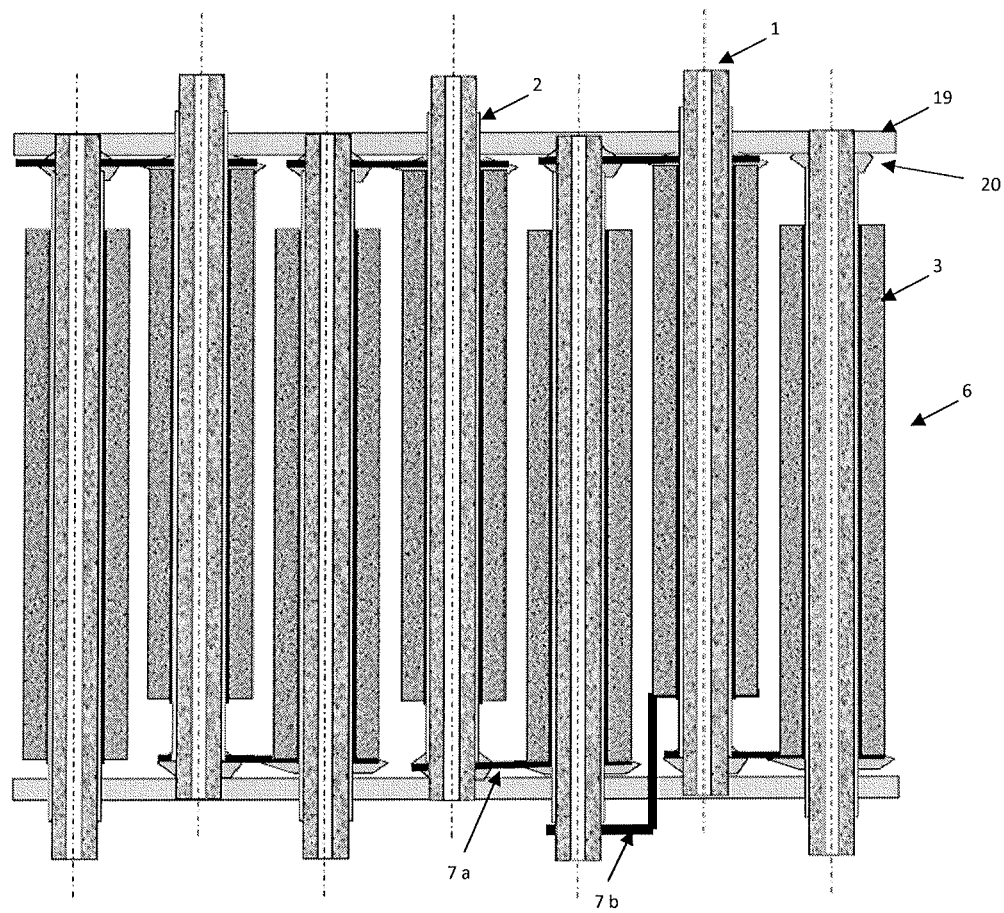
Figur 6

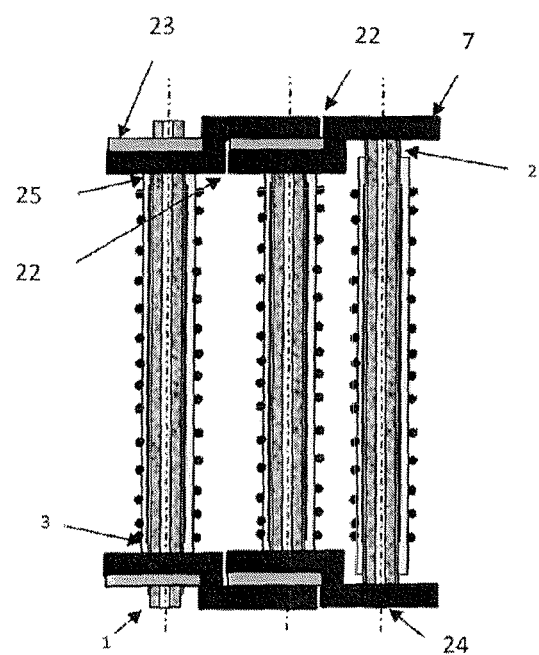
Figur 7a

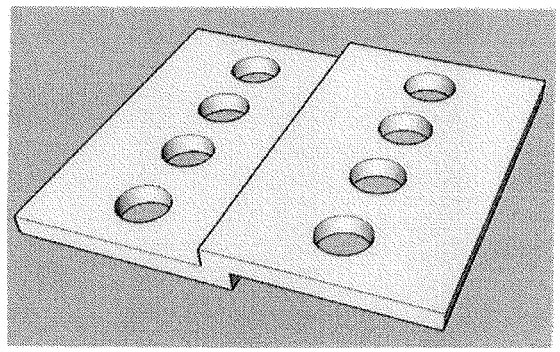
Figur 7b
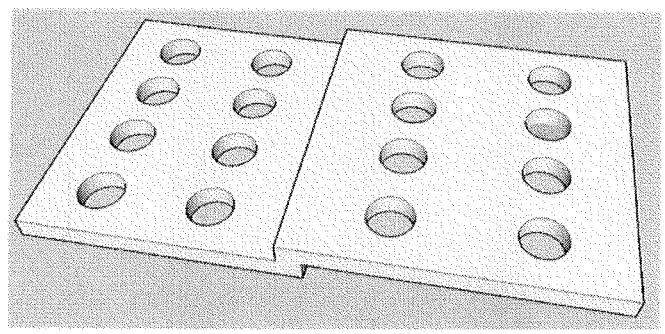
Figur 7c

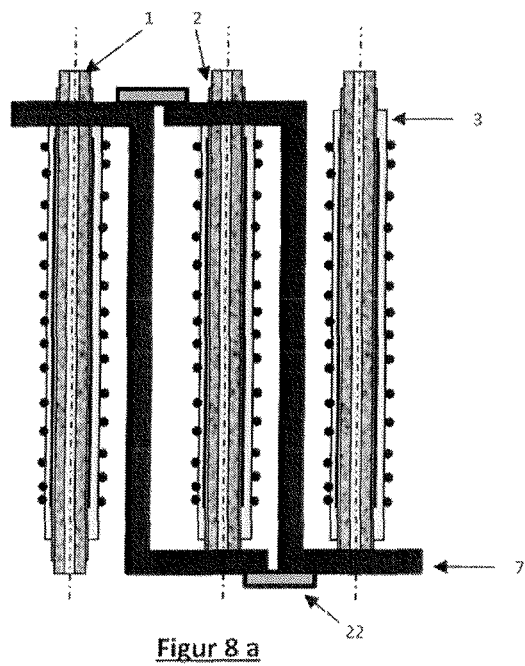
Figur 8 a
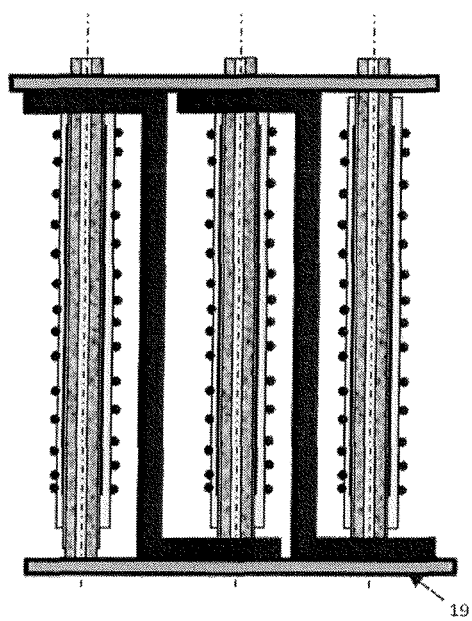
Figur 8 b

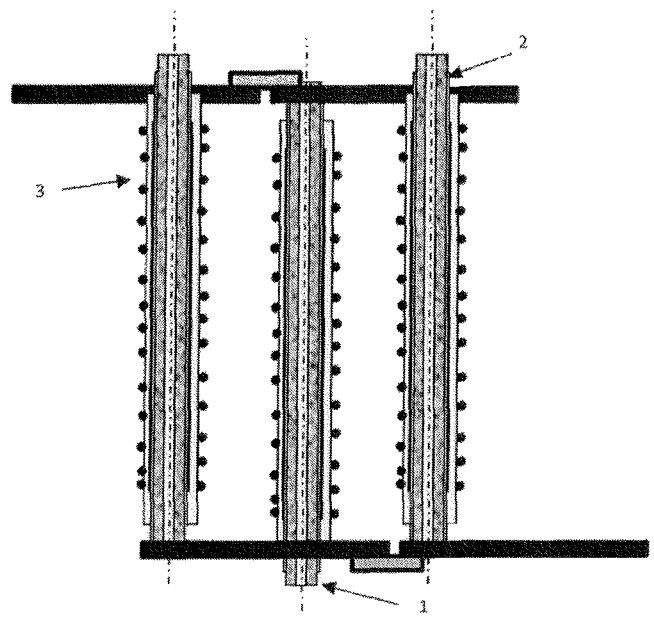
Figur 9 a
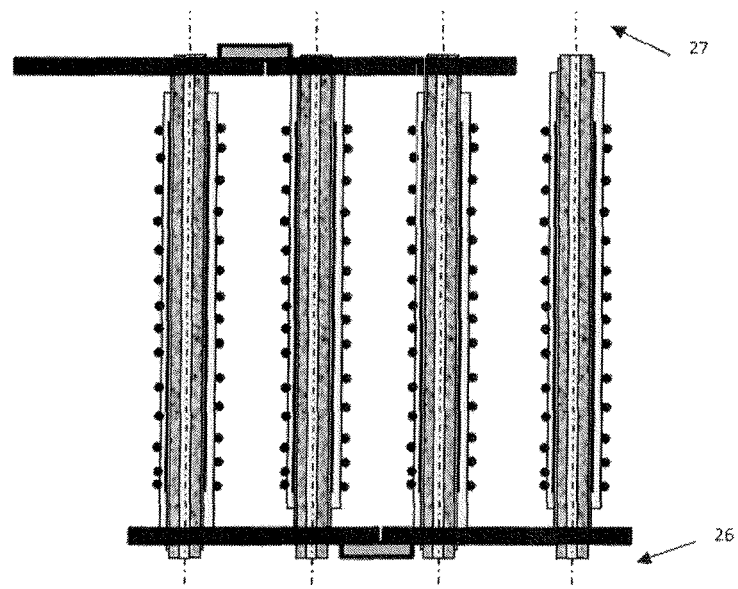
Figur 9 b

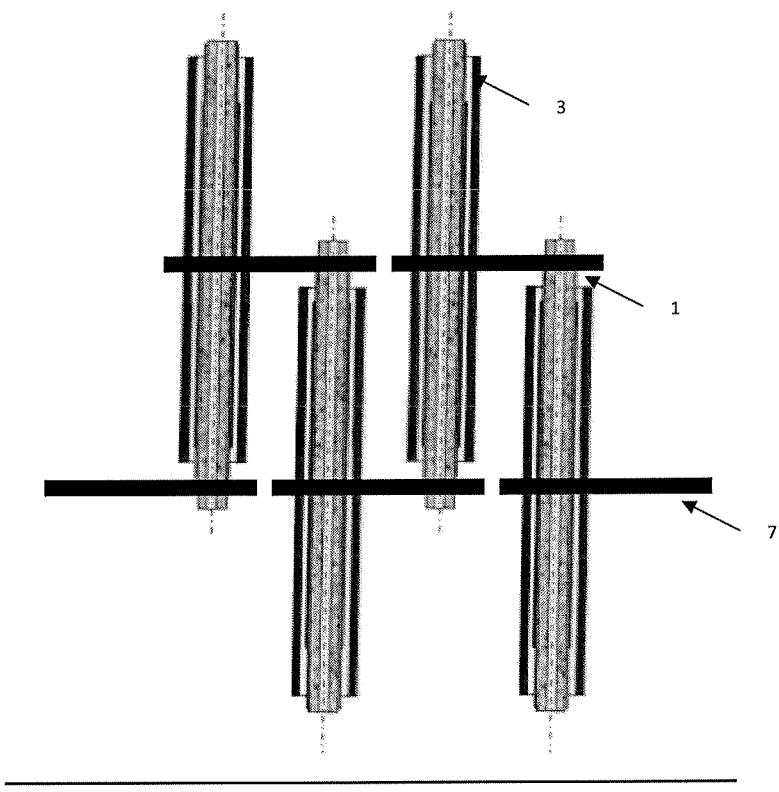
Figur 10

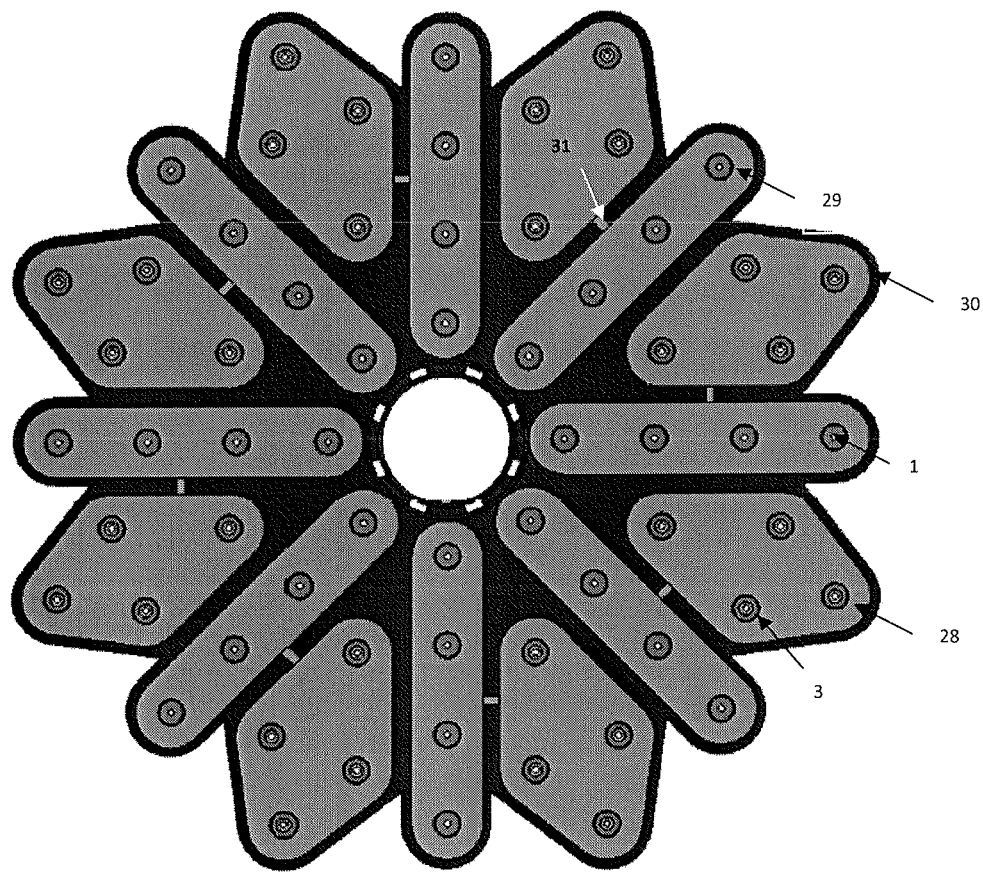
Figur 11

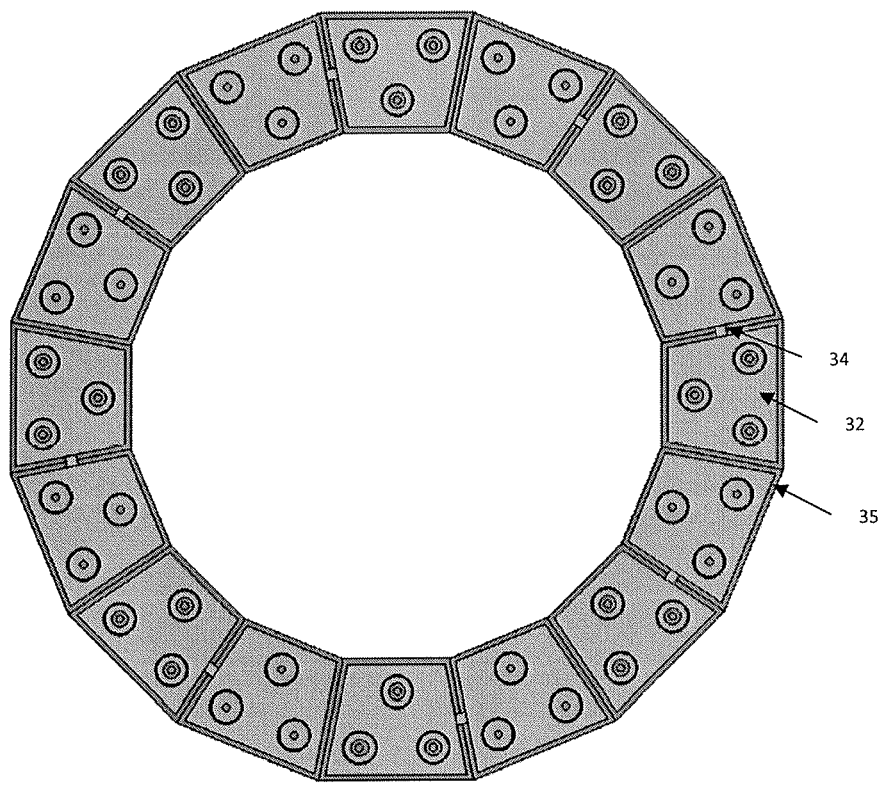
Figur 12

FUEL CELL STACK

This is a national stage of PCT/EP10/004356 filed Jul. 16, 2010 and published in English, which claims the priority of German number 10 2009 034 032.7 filed Jul. 16, 2009, hereby incorporated by reference.

The present invention relates to fuel cell systems, in particular fuel cell systems that are based on tubular fuel cells and/or on solid oxide fuel cell systems (SOFC systems).

Fuel cells have long been known as tertiary voltaic elements. In the case of fuel cell systems that are based on tubular fuel cells there is always a more difficult effort related to the serial interconnection of the cells compared to planar systems. On the other hand, a low loss, parallel interconnection at certain current density can hardly be realized easily and/or the high voltages needed for electrical devices are achieved only by serial interconnection of several fuel cells.

It is the object of the present invention to provide a compact serial interconnection of a number of tubular fuel cells that can be produced easily. Beyond that, the object consists thereof, to make the assembly of individual tubular SOFCs possible in such a way that a low loss tapping of current by the cells and a minimization of the ohmic losses are possible. Thereby, the total weight of the fuel cell system may not become unnecessarily high.

This problem is solved by a fuel cell system according to claim 1. Further advantageous embodiments of a fuel cell system in accordance with the invention can be learned from the subordinated claims.

The individual characteristics of the examples of embodiments described in the following can thereby also be realized independently of each other within the scope of the present invention, thus they do not need to be realized precisely with the combination of characteristics in the examples.

Typically, tubular fuel cells within the scope of the invention have a diameter of 0.1 mm-40 mm, preferably 1 mm to 5 mm.

A fuel cell system in accordance with the invention, in particular [a] solid oxide fuel cell systems (SOFC system), is equipped with several electrically serially interconnected tubular fuel cells, whereby several of these fuel cells respectively comprise at least one inner electrode, an electrolyte that surrounds this inner electrode at least in sections and an outer electrode surrounding the electrolyte at least in sections in such a way that the electrolyte prevents an electric contact of the inner and the outer electrode.

It is the basic idea of the invention to configure or fixate these fuel cells in pairs in or on a conducting electric carrier that connects—electrically conducting—the inner electrodes of the first tubular fuel cells of the at least one pair with the outer electrodes of the second, preferably directly adjacent, to the first tubular fuel cells of the at least one pair of tubular fuel cells.

Preferably, in accordance with the invention it is a design of a fuel cell stack of at least two tubular, preferably micro-tubular SOFCS, which consist of at least one inner electrode, an electrolyte largely surrounding this inner electrode and an outer electrode largely surrounding this outer electrode, whereby the electrolyte prevents a direct contact of the inner and the outer electrode, whereby in the stack at least a partial serial interconnection of the fuel cells is made possible thereby, that at least two of these fuel cells are located or affixed on an electrically conducting carrier and/or contact, which connects—electrically conducting—the inner electrode(s) and/or electric contact(s) of the inner electrode of the first or the second part of the tubular fuel cell(s) with the outer electrode(s) and/or electric contact(s) of the outer electrode(s) of the second or the second part of the tubular fuel cells, preferably directly adjacent to the first or the first part of the tubular fuel cell(s).

The design solution of the contact of the inner and outer electrode of different cells is solved advantageously as follows: Either a slightly inclined structure of the cell housing units (plates) is used, so that (perhaps with extensions) on one hand the outer electrode of a fuel cell is in contact with the plate and on the other hand the inner electrode of a different fuel cell is in contact with the same plate, while the fuel cells are preferably located extending along the longitudinal axis in a plane. This plate is then separated by an isolation layer from a different plate, which contacts the inner electrode of that fuel cell, which was contacted by the first plate at the outer electrode.

Alternatively, tubes corresponding to the embodiments described later (FIGS. 4 and 5) can also be used, whereby the fuel cells are inserted into these tubes and thereby a contact results with the inner electrode and by the extensions of these tubes also the outer electrodes of adjacent fuel cells can be contacted. The serial interconnection in accordance with the invention can also be achieved thereby, that fuel cells are built into one or several electrically conducting carrier(s) and/or contact(s), so that by means of a configuration of the carrier/contact or of parts of the carrier/contact at an angle that is not perpendicular to the cell axis, on one hand the outer electrode(s) of one or several fuel cell(s) is in contact with the carrier/contact and on the other hand the inner electrode(s) of one or several other fuel cell(s) is in contact with the same carrier/contact.

The interconnection in accordance with the invention can also be achieved thereby, that fuel cells are built into one or several electrically conducting carrier(s) and/or contact(s), so that by means of a bent or angled form of the carrier/contact or the extension of the carrier/contact a difference in height is created extending along the cell axis and thereby on one hand the outer electrode of one or several fuel cell(s) is in contact with the carrier/contact and on the other hand the inner electrode of one or several other fuel cell(s) is in contact with the same carrier/contact. The system can also be characterized thereby, that fuel cells are built into one or several electrically conducting carrier(s) and/or contact(s), so that by means of a vertically offset, alternating configuration of the carrier/contact and/or fuel cells along the cell axis on one hand the outer electrode(s) of one or several fuel cell(s) is/are in contact with the carrier/contact and on the other hand the inner electrode(s) of one or several other fuel cell(s) is/are in contact with the same carrier/contact.

A carrier and the cells built into it (in the case of tubes) or the respectively contacted cells at only one—for example, the inner electrode—(in the case of plates) can form units, which can be assembled by being stacked into each other and/or connected with the stack housing and corresponding gas connections into a total stack. The resulting two poles of the interconnected sub-units are connected toward the outside with two additional electrically conducting components (if appropriate with parts of the stack housing) for additional tapping of current.

The electric contact of the inner electrode with the electrically conductive carrier/contact is preferably given thereby, that the micro-tubular fuel cell is integrated at the ends into these cell housing units in such a way, that the surface of the cell housing unit, which is oriented in the direction of the outer electrode is at or approximately at the same height as the transition between the electrolyte and the inner electrode of the micro-tubular SOFC. At this position, preferably, for example, by soldering by means of a metallic gasket (preferably silver or a silver alloy—for example, consisting of Ag, Cu, Al, W, Ca, Ni—or a different silver-containing compound such as, for example, a mixture of silver and ceramic/oxidic material (e.g. aluminum oxide, zirconium oxide, nickel oxide, copper oxide, . . . )) a separation of the gas compartments of the inner electrode and the outer electrode is given, whereby these gaskets, because of their electric conductivity, also permit the electric contact between inner electrode and the cell housing unit.

In addition, a different gasket can also be affixed, preferably at the downstream face, so that the metallic gasket is exposed only to a gas atmosphere, preferably the reducing gas atmosphere. This additional gasket can be provided, for example, as a ceramic adhesive. In this case, the metal component can also be used for the improvement of the electrical contacting only and the sealing effect is met by other sealing materials (e.g. ceramic adhesives). In this case, the metal component does not necessarily represent a contact between electrolyte, inner electrode and cell housing unit, but can also only connect the inner electrode and the cell housing unit.

The cell housing units are preferably built as (a) system(s) consisting of two opposite plates. Each of these plates preferably has at least two recesses for housing at least two micro-tubular SOFCs. Several of these cell housing units, the co-called subordinate gas distribution units can then be interconnected with a superordinate cell housing unit, whereby this unit preferably leads to a separation between the gas compartment of the outer electrodes and the inner electrodes. Hereby, it is important that the subordinate gas distribution units are electronically isolated from each other by electric isolators. These isolators—in the design described here—are preferred as films of a ceramic material such as, for example, aluminum oxide or zirconium oxide with a thickness of 1 to 10,000 μm.

Alternatively, ceramic adhesives, glass components and/or ceramic layers can be applied to the cell housing units (e.g. by spraying, immersing, EPD or discharge by the steel) or other non-conductive layers (e.g. metal oxides, applied by galvanic metal precipitation and subsequent oxidation) can be used as isolators. In the case of closed cell housing units (e.g. tubes (17)) as carriers, in the simplest case the isolator and/or the electrically isolating layer between adjacent carriers is simply the gas atmosphere between the tubes (e.g. air).

In a special variant, the system is structured in such a way that individual cells or cell aggregates can be removed again reversibly from the system, in order to remove damaged cells or seals from the stack, which has an overall effect of a longer lifecycle for the stack. In an even more special embodiment, this is ensured by means of compression seals.

The reversible removal is preferably ensured thereby, that there is no material connection between the subordinate cell housing units. This is, for example, ensured thereby, that for the electric isolation between the individual units, a ceramic adhesive is used, which can be removed again with corresponding solvents—such as, for example, water, acid, base—perhaps with the help of vibrations, which can be produced, for example, by ultrasound. Alternatively, a glass component can also be used that is soft enough at higher temperatures so that the individual subordinated gas distribution units can be separated from each other if necessary. In a special embodiment, these subordinated gas distribution units are connected gas-tight with each other by means of a compression seal. For this, by increasing the pressure on the compression seal, which consists, for example, of mica or ceramic paper/film of fibrous material of, for example, aluminum oxide or zirconium oxide, a gas-tight connection can be achieved. This external pressure can, because of the weight load (perhaps only dead weight) or by application of a different force, for example, can only be achieved by a firm reciprocal screw connection of individual cell housing units.

In conjunction with FIGS. 1 to 6, examples of embodiments of the invention will be described in the following.

FIG. 1

In FIG. 1, a design of interconnected tubular SOFCs (6) is shown, which consist of at least one inner electrode (1), an electrolyte (2) largely surrounding this inner electrode (1) and an outer electrode (3) largely surrounding the electrolyte (2), whereby the electrolyte (2) prevents a direct contact of the inner and outer electrode (1, 3). On the outer electrode there is also a device (4) for better current conduction of the outer electrode, which can also be evenly distributed over the entire outer electrode (3).

Such devices (4) for better current conduction of the outer electrodes can hereby consist of electron-conducting materials, which are stable under the operating conditions (temperature, gas atmosphere, of the outer electrodes. Examples of this for the cathode atmosphere and anode atmosphere can be precious metals or precious metal alloys (e.g. consisting of silver, platinum, gold, copper, zinc, tin), high temperature steel (perhaps oxide-forming steel or steel with a special protective layer to prevent chromium evaporation) or ceramic materials (e. g. Perowskite). If the atmosphere of the outer electrode is reducing, nickel, copper or other metals that can be oxidized are suitable, for example. Alternatively, in an oxidizing atmosphere, oxidizing compounds can also be used, to the extent these form a dense protective layer against further oxidation and/or the oxides of these compounds conduct electrons under the operating conditions. This device (4) can, in the simplest case, consist of a wire wound around the outer electrode. Further, contacts pressed onto the outer electrode (for example by contraction) or soldered contacts are also possible. Even an applied porous layer—for example, by spraying, immersion, electrophoreses or printing—of electron-conducting material is within the scope of this invention. Hereby, it is of primary importance to have a density that is as high as possible at the contact points to the outer electrode, without thereby negatively influencing the required porosity of the gas supply.

There is a gas channel (5) in the inner electrode for supplying the inner electrode (1). The tubular fuel cells (6) are built into an electrically conducting carrier/contact (7), whereby this carrier (7) contacts the inner electrode at position (8), and at position (9) the outer electrode of two adjacent fuel cells (6), whereby this/these contact(s), for example, can be ensured or improved by a contact paste made of, e.g. silver, copper, gold, platinum or other conducting materials. In the conducting carrier—the subordinate cell housing unit (7)—of course, several cells can also be electrically interconnected in parallel, which can be envisioned by means of a projection out of the plane of the drawing.

The contact position (8) between the inner electrode (1) and the cell housing unit (7) is hereby ensured thereby, that the inner electrode (1) is inserted into a plate of a subordinate cell housing unit (7), as a result of which (1) is enclosed by (7). To enlarge the contact surface, bulges/extrusions (13) of (7) can be attached in the direction of that component of the inner electrode (1) that is not covered by the electrolyte (2) and the outer electrode (3). In a specific case, these bulges (13) are simply produced by extrusions and/or bores. Also correspondingly designed are the contact positions (9) between (3, 4) and (7). The contact can take place by simple joining (e.g. pressure contact by contraction) or by a material contact (e.g. soldering and welding).

In the simplest case, the electrically conducting carrier is a plate with apertures, into which the micro-tubular SOFCs are inserted. The gap between the apertures and the individual cells hereby are to be as small as possible, so that a non-material connection such as a clamp connection (e.g. by contraction) can occur or a sealing and contact by a material process with ceramic adhesive, glass component, metal component or welding.

Because of the insertion of an electric isolator (10), adjacent fuel cells (6) are interconnected in series and an electric short is prevented. Electrically non-conductive materials (e.g. ceramics, which can, perhaps also act as compression seal) can be used as isolators and/or the conducting carriers can be provided with a non-conductive ceramic layer at the surface or at parts of the surface. Alternatively, ceramic adhesives can also be used.

In a preferred variant, this isolator also serves as gas seal to separate the atmosphere of the inner and outer electrodes, whereby here, among other things, ceramic adhesives or glass components can be used, whereby further, the glass components make it possible because of a soft consistency to have an increased flexibility during operation in the event of vibrations or thermal expansion. In a preferred variant, this gasket (10) is a reversibly removable gasket, in an even more preferred variant, a compression seal, which unfolds its sealing effect by compressive force and can easily be removed again by releasing the compressive force.

This gasket can, for example, consist of mica, aluminum oxide or zirconium oxide. There is also the possibility that the isolation (10) meets none or only a partial sealing function between the inner and outer electrode (1, 3) and that in this way, a targeted burning off of the anode gas takes place by the cathode gas, which means an additional heat source in the stack.

The metal components that have perhaps been used for the connection between carrier and fuel cell (preferably silver components of pure silver, silver alloys or composite materials of silver and other inorganic materials, preferably ceramic materials and even more preferred oxides) and/or glass component gaskets become ductile at the higher temperatures, which helps to reduce the mechanical/thermal loads of the connections.

In the configuration shown in FIG. 1*a*, there is a blending of the atmosphere of the inner and the atmosphere of the outer electrode (1, 3) at side (12), as a result of which a burning off of the fuel supplied to the fuel cells takes place and heat is created thereby. (11) hereby represents a potential extension at the cells (6), so that the flame formation does not take place directly at the—preferably micro-tubular—SOFCs. In particular, (11) can hereby be a porous burner, whereby the carriers of this burner were produced in a special manufacturing process together with the inner electrode (1) by means of a ceramic process, in particular—but not exclusively—by means of an injection molding process.

The design characteristic of claim 23 results automatically when the mixing of the fuel (e.g. atmosphere of the inner electrode) and the oxidation agent (e.g. air on the outer electrode) occurs and a sufficient ignition temperature (hydrogen starting at approximately 560° C., hydrocarbon lower, starting at approximately 200° C. or lower in the presence of a catalytic material) is present. In this case it is important that sufficiently high concentration of oxygen and fuel are still present, so that the ignition limits (depending, for example, on the fuel concentrations and concentrations of the other reaction partners, hydrogen in air lower limit approximately 4% by volume) can be maintained at least during the starting process.

A product according to Method claim 26 can be recognized by a seamless transition between the individual sections. Nothing must be applied afterward by a separate joining technique (e.g. adhesion). In principle, the desired product is produced thereby, that a mass (feedstock) that is viscous at higher temperatures is injected into a correspondingly produced mold (most of the time made of abrasion-proof stainless steel) and is removed after hardening. The mold can be selected in such a way that individual sections (e.g. extensions) are formed differently than the fuel cell (in contrast, for example, to extrusion). Several sections can also be extruded from different materials (either sequentially or simultaneously).

In the simplest case, the extension (11) can be a ceramic tube, which was attached to the preferably micro-tubular solid oxide fuel cell using a ceramic adhesive, a metal or glass component. In a specific configuration, this tube can be coated at the end with a catalytically active substance (e.g. platinum or platinum/rhodium), which also makes an ignition at low temperatures possible. In an even more specific configuration, the substrate of the fuel cell is injection molded together with this attachment piece, whereby this attachment piece is them made of a porous material, preferably not the substrate material such as, for example, zirconium oxide or aluminum oxide or cerium oxide, which was coated after the injection molding process perhaps with a catalytically active substance (precious metals or subgroup elements, in particular the rare earth [elements]), for example, by immersion coating or impregnation with suspensions or salt solutions of these elements. This attachment piece preferably has approximately the diameter of the micro-tubular fuel cells that are used and a length of 0.1-100 mm, preferably a length of 10-30 mm.

Because of the use of a catalytic porous burner, even very low fuel concentrations in the exhaust of the fuel cells (6) can also be burned or ignited.

In FIG. 1*a*, for example, the cells (6) at position (8) or (9) can be fixated with the conducting plate (7), as a result of which respectively one cell (6) and a conducting carrier (7) form a unit during assembly.

FIG. 1*b* shows a configuration in which the cells are built into a conducting carrier (7) at both ends, as a result of which the current paths within the inner and outer electrodes are halved toward the electrically conducting carriers (7). In a specific configuration of the invention, a separate electric isolator (10) can be dispensed with. In this configuration, the conducting carrier (7) forms, in operation or in the production of the system—for example, but not exclusively by means of a soldering process—an electrically isolating layer on the surface. In an even more specific configuration, this carrier form aluminum oxide as electrical isolation layer. The isolating layer hereby forms at those positions, at which the surface of the conducting carrier (7) can come in contact with an oxidizing atmosphere. The thickness of this layer is in the range of 50 nm to 1 mm.

In the case of a one-sided installation of the fuel cells into the carrier (compare FIG. 1*a*, as well as claims 14 and 15), the mechanical loads at the cells are significantly reduced in the case of vibrations or thermal expansions, as the cells can move freely in one direction, and thereby no critical tensions are created, which could lead to a failure of a cell or gasket failure and/or the tensions at the connection points are significantly reduced, as the cells can always expand in the free direction. In the case of two-sided installation (FIG. 1*b*), this compensation is possible then, when soft (i.e. soft at operating conditions) connection materials such as those used here, for example, at positions (8/9).

The resulting two poles of the interconnected sub-units in FIG. 1 (and also in the other Figures) are connected toward the outside with further electrically conductive components (perhaps parts of the housing) for tapping additional current.

FIG. 2:

In FIG. 2, the tubular fuel cells (6) analogous to FIG. 1, are interconnected serially, whereby in this case, a two-sided current tap comparable with FIG. 1b is shown. The cells (6) hereby have fixated contact devices (14) at the outer electrode (3),—such as, for example, circuit plates—which, for example, are connected to these electrodes (3) by soldered rings (15). These devices are then in contact with the electrical contacts (13) of the inner electrodes (1) of adjacent cells (6), as a result of which a serial interconnection of the individual cells becomes possible. In the specific device shown here, an isolation layer (16) is applied between the contacts (13) of adjacent cells, which can be pressed together in this way and which thereby, also functions as gas seal. To stabilize the rings at the outer electrodes of the cells, corresponding supporting elements can also be attached. By releasing the compression force, the individual cells can be dismounted again in the event of a defect. Hereby, the electrical contacts (13) can be connected—electrically isolated from each other and form a unit for gas distribution of the atmosphere of the inner electrode (1) or contain devices, due to which the electrical contacts (13), (here drawn open in cross section) in a simple plug, screw or a different connection method can be integrated into a gas distribution device such as, for example, a plate for separating the atmosphere of the inner and outer electrodes (1, 3). This plate is then electrically isolated from (13). Alternatively, or additionally to gasket (16), at position (19) a gasket can also be installed, preferably an electrically conducting compression gasket (e.g. conductively coated or saturated mica). The contacts (13) along the cell axis can also be extended and can thus serve as separate gas supply units to the fuel cells (6).

The cells with the rings (14) can be a previously produced unit, which is then inserted, for example, into device (13) and after attaching the ring (16) sealed against each other (e.g. by sealing with soldering metal).

In one embodiment, this ring (16) can also consist of a ceramic adhesive, which simultaneously serves as electric isolator and as sealing element.

Of course, in (13) or (14), several cells can also be interconnected in parallel by a multiple side by side series of electrically parallel interconnected cells, which can be envisioned, for example, by a projection out of the plane of the drawing in FIG. 2.

FIG. 3:

Fuel cell system analogous to FIG. 1, whereby in this configuration a serial interconnection between the fuel cells (6) is accomplished by a corresponding offset of the electrically conducting carriers (7) and, as shown by way of example in this case, also of the fuel cells (6). In the configuration shown here, the cells are only interconnected at one end. Comparable with FIG. 1b, this can, however, also be done on both sides. The cell housing units (7) have no contact with each other or only at positions at which they are electrically isolated from each other, as shown here schematically by the inserted isolator (10). At the contact positions (19), at which this isolator (10) is not inserted, an electrically isolating coating can also be applied to the cell housing unit (7).

FIG. 4:

The fuel cell system in which the electrical carrier (7) is designed as gas distribution tube (17) and any number of cells (6) can be interconnected in this tube. By corresponding contacts (18), these units can be serially interconnected in the gas distribution tubes (17), whereby in the special configuration shown here, the contacts (18) are integral extensions of the carriers (17). In the configuration shown here, the cells are only interconnected at one end. Comparable with FIG. 1b, this can, however, also be done on both sides. The gas distribution tubes (17) and the fuel cells (6) that are integrated in them represent joint units, which can be exchanged as desired in a system, whereby defective units can, if necessary, be exchanged cost effectively.

FIG. 5:

A fuel cell system corresponding to FIG. 4 is shown with a different form of the gas distribution tube (17) with extensions (18). In the configuration shown here, the cells are interconnected only at one end. Comparable with FIG. 1b, this can also be done on both sides.

According to claim 27, a tube can thus be realized, that has apertures into which the micro-tubular fuel cells are inserted. Hereby, the gap between the apertures and cells is to be as small as possible so that a non-material connection such as a clamp connection (e.g. by contraction) can occur or a sealing and contact by a material process with ceramic adhesive, glass component, metal component or welding. In the simplest case it is a steel tube into which apertures have been drilled, and the cells were inserted. The serial interconnection is ensured by extensions at the tubes, which form a contact to the outer electrodes of adjacent fuel cells. The length/diameter/form of the tubes, as well as the number of fuel cells housed in them is flexible.

FIG. 6:

In FIG. 6, the carriers are designed as electrically isolating plate (19) for gas distribution, which is provided with corresponding electrical contacts or contact layers (7). Here, the plate can be formed completely of ceramic material, alternatively, the plate can also consist of conducting material, which is coated on the entire surface or only at surfaces that come in contact with electric contacts (7) and/or electrodes (1, 3), with an electrically isolating layer, or can be covered with electrically isolating material. In this case the carrier/electric contact (7) is primarily used as electric contact between adjacent cells (6), while the mechanical stabilization of the cells and also the gas distribution is performed by plate (19). The cells (6) can be sealed by gaskets, particularly preferred conducting gaskets (20) to improve the contact between the cells (6) and the contacts (7) to the gas distribution plate (19), which effects a separation of the gas compartments of the inner and outer electrode (1, 3).

As a result of these contacts (7) and by longitudinal offsetting along the cell axis, a serial interconnection of the cells (6) is achieved. By means of this offsetting, both ends of the cells can have a symmetric distance of the electrolyte (2) and the outer electrode or electrode conducting layers (3) from the cell ends and in spite of that alternating, the outer and inner electrode at the opposite cell ends can be contacted. Because of the additional contact (7b), it is achieved that the current path of the outer and inner electrode (1, 3) is halved.

Of course, in (7), several cells can also be interconnected in parallel by a multiple side by side sequence of electrically parallel interconnected cells, which can be envisioned, for example, by a projection out of the drawing plane in FIG. 6.

FIG. 7:

In FIG. 7a, the carrier/contact (7) is bent, as a result of which a serial interconnection of the cells (6) is achieved. At positions (24), the contacting to the inner electrode (1) takes place and at the positions (25), the contacting of the outer electrode (3). In the configuration shown here, the tapping of current by both electrodes takes place at both cell sides. At positions (22), an electric isolator (23) is attached, which can additionally serve as seal between the gas atmosphere of the outer and inner electrodes (1, 3). This isolator can be a ceramic adhesive, a glass component, a compression seal or a different electrically isolating material. Analogous to the figure, the contacts (7) can also be supported by a non-conducting, or at least on the surface, non-conducting plate.

FIG. 7b schematically shows a potential carrier (7), in which respectively 4 cells can be interconnected at the outer electrode and 4 cells at the inner electrode corresponding to FIG. 7a. This results in a serial interconnection of respectively four parallel interconnected cells.

In FIG. 7c, a carrier for the series interconnection of respectively eight parallel interconnected cells is shown.

FIG. 8:

In FIG. 8, the serial interconnection takes place by means of the carrier/contact (7) by connecting the opposite sides of two adjacent cells, whereby on the one side of the one cell the outer electrode (3) and at the other side of the other cell the inner electrode (1) is contacted. At positions (22) in FIG. 8a, an electric isolator is attached, which can additionally serve as seal between the gas atmosphere of the outer and inner electrodes (1, 3).

Comparable to FIG. 6, in FIG. 8b, an electrically isolating plate (19) is attached.

Of course, the serial interconnection of the carriers (7) such as, for example, shown in this FIG. 8, is also possible in all three spatial directions.

FIG. 9:

In FIG. 9a, comparable to FIG. 6, a serial interconnection takes place by offsetting along the longitudinal axis of the fuel cells, whereby here, in contrast to FIG. 6, no continuous electrically isolated plate (19) is attached, but at positions (22), an electric isolator is attached, which can also serve additionally as seal between the gas atmosphere of the outer and inner electrodes (1, 3).

In contrast to that, in FIG. 9b the serial interconnection is achieved by asymmetrically attached outer electrodes (3) along the cell axis.

By alternating attachment of the cells with the outer and inner electrode (1, 3) in the carrier (7) at side (26) and side (27), the serial interconnection is achieved, whereby in contrast to FIG. 9a, the cells in the longitudinal axis are configured in a plane.

FIG. 10

In FIG. 10, the serial interconnection of the fuel cells takes place by means of carriers/contacts (7), that respectively connect the outer electrode (3) of a fuel cell with the inner electrode (1) of the adjacent fuel cell, whereby a carrier/contact (7) is located centrally on the outer electrode and the inner electrode is contacted at least at one end. In this way, a stack is created of at least two levels that are offset step-wise with respect to each other.

FIG. 11:

FIG. 11 is a top view of a stack with a closed geometry, whereby two geometrically different types of electrically conducting carriers (28, 29) are embedded into an electrically isolating carrier (30). In the kite-shaped carriers (28), in this example, the outer electrodes (3) of four fuel cells are electrically conductively and thus these four cells are interconnected in parallel, in the linear carriers (29), the inner electrodes are contacted. The serial interconnection of electrically conducting carriers (28) and (29) takes place via contacting plates (31)

FIG. 12:

In FIG. 12, an additional stack variant is shown in a top view. Here, trapeze-shaped electrically conducting carriers (32) form a circular stack, whereby in each carrier respectively three cells are contacted in parallel and each carrier is interconnected in series with an adjacent carrier via an electric contact (34). Each electric carrier is thereby embedded into an isolation (35). The cells are configured in such a way that they form two circles around a joint center and seen from the center of the circle, no cell is covered up by one or more other cells, so that, for example, in a configuration of an afterburner in the center of the circle, the thermal radiation reaches each cell at nearly the same level and thus an even heating of the cells can take place.

The invention claimed is:

1. A solid oxide fuel cell system comprising a plurality of tubular fuel cells, each fuel cell including at least one inner electrode, an electrolyte surrounding at least a section of said inner electrode, and at least one outer electrode surrounding the electrolyte so that the electrolyte spatially separates the inner and outer electrodes from each other:
    at least a first tubular fuel cell and a second tubular fuel cell of said plurality of tubular fuel cells being connected to an electrically conducting carrier that includes a plate having electrically conductive surfaces, said first and second tubular fuel cells located adjacent each other within openings in said plate, an inner electrode of said first tubular fuel cell being in electrical contact with a conductive surface of said plate and an outer electrode of said second tubular fuel cell being in electrical contact with a conductive surface of said plate, such that the plate provides a direct electrical connection between the inner electrode of said first tubular fuel cell and the outer electrode of the second tubular fuel cell, said plurality of tubular fuel cells being electrically interconnected in parallel and/or in series with one another.

2. A solid oxide fuel cell system comprising a plurality of tubular fuel cells, each fuel cell including at least one inner electrode, an electrolyte surrounding at least a section of said inner electrode, and at least one outer electrode surrounding the electrolyte so that the electrolyte spatially separates the inner and outer electrodes from each other;
    at least a first tubular fuel cell and a second tubular fuel cell of said plurality of tubular fuel cells being in contact with an electrically conducting carrier that includes a gas distribution tube having an electrically conductive surface, said first and second tubular fuel cells located adjacent each other, an inner electrode of said first tubular fuel cell being in direct electrical contact with said conductive surface of said gas distribution tube and an outer electrode of said second tubular fuel cell being in direct electrical contact with a conductive surface of said gas distribution tube, thus electrically connecting the first and second tubular fuel cells with each other.

3. Fuel cell system according to claim 1, wherein said plate electrically connects more than two fuel cells by connecting an inner electrode and an outer electrode of adjacent fuel cells whereby several fuel cells are interconnected electrically parallel with the inner and several fuel cells with the outer electrode.

4. Fuel cell system according to claim 1, wherein said first and second fuel cells have a serial interconnection.

5. Fuel cell system according to claim 3, further comprising a plurality of plates with fuel cells electrically interconnected in each plate and wherein an electric isolator is inserted between the plates, so that the fuel cells are electrically interconnected in series.

6. Fuel cell system according to claim 5, wherein the isolator comprises a ceramic material.

7. Fuel cell system according to claim 6, wherein the isolator is a gas sealing element between the atmosphere of the outer and the inner electrodes of said tubular fuel cells.

8. Fuel cell system according to claim 1, wherein said electrically conducting carrier comprises a pair of plates and each of said first and second fuel cells are located within plate apertures at each end of the fuel cells.

9. Fuel cell system according to claim 1, wherein the fuel cells are micro-tubular fuel cells.

10. Fuel cell system according to claim 2, wherein said first and second fuel cells are electrically interconnected in parallel through said gas distribution tube.

11. Fuel cell system according to claim 3, wherein said fuel cells are connected to said plate at an angle that is not perpendicular to the cell axis.

12. The fuel cell system of claim 2, wherein a supply of operating gases is distributed within the gas distribution tube to supply operating gases to the surfaces of the electrodes of at least one of said first and second tubular fuel cells.

* * * * *